Nov. 26, 1940.   L. C. SMITH   2,223,298
THERMOSTATIC EXPANSION VALVE AND VALVE CONTROL ELEMENT
Filed Sept. 19, 1936
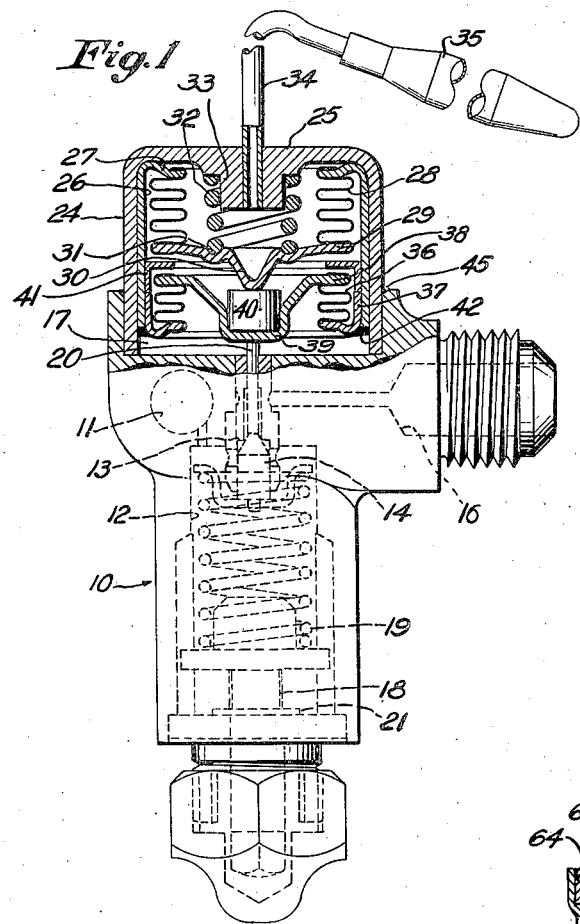
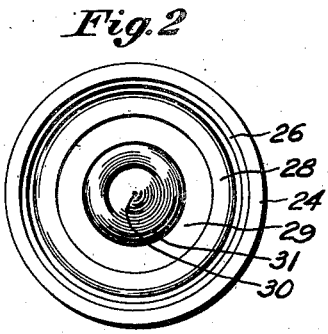
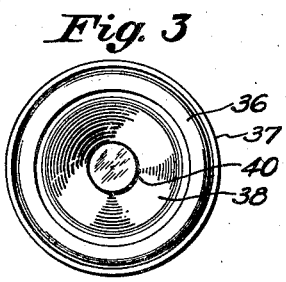
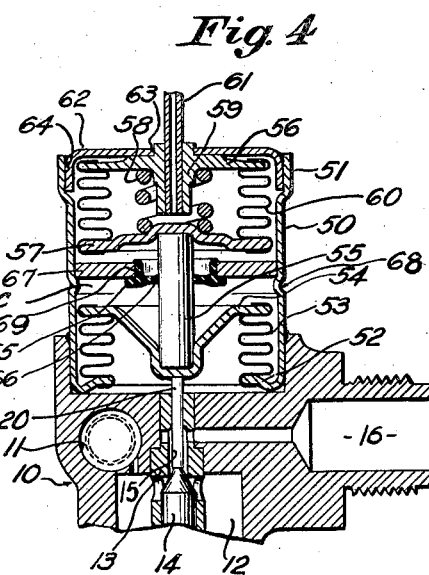
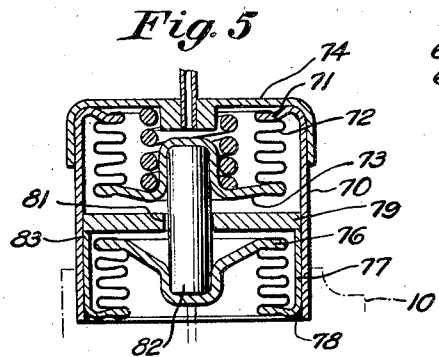
Inventor
Lawrence C. Smith
By Albert R. Henry
Attorney Patented Nov. 26, 1940

2,223,298

UNITED STATES PATENT OFFICE 2,223,298

THERMOSTATIC EXPANSION VALVE AND VALVE CONTROL ELEMENT

Lawrence C. Smith, Kenmore, N. Y., assignor to Fedders Manufacturing Company, Inc., Buffalo, N. Y.

Application September 19, 1936, Serial No. 101,649

2 Claims. (Cl. 236—92)

This invention relates to thermostatic expansion valves and particularly to that type of valve which finds application in controlling the flow of refrigerant, and it is concerned directly with the provision of an improved thermostatic valve and a unitary control element applicable to valves to convert them readily into efficient thermostatic controls.

Heretofore the art has recognized automatic expansion valves, in which there has been provided a valve body with a diaphragm or like flexible member responsive to pressure changes, and thermostatic expansion valves, in which the net effect of pressure changes is modified through the operation of a second flexible member whose distention is determined by the temperature at some point in the system. In order to convert one type of valve into the other, it has merely been necessary to add or remove the thermostat or "power element." While such assembled valves have been widely used and have given a fair measure of satisfactory service, they have nevertheless been unduly expensive and have too frequently failed prematurely.

Some of the causes for these disadvantages may be found in the concept of a thermostatic valve as an expansion valve plus a power element, which has led to unnecessary manufacturing costs when compared to valves made according to the present invention. Other causes are to be found in the extreme care which must be employed in effecting the accurate assembly of large numbers of valves,—unless extreme care is used there are too many defective valves, and if such attention is constantly given, the cost is high.

In view of these practical considerations, the present invention contemplates a thermostatic expansion valve which is solely such a valve, as distinguished from an expansion valve to which a power element is coupled. To that end, it is proposed, according to one aspect of the invention, to provide a valve body having a part which may be likened to a breech for the reception of a unitary sub-assembly of the flexible members constituting a cartridge which can be quickly inserted into the breech. Such cartridge loading not only completes the entire thermostatic expansion valve, but also leads to economies in manufacture without loss of precision, since the cartridges may be made according to a high standard of uniformity.

It has also been customary in prior valves to provide some type of adjustment for the power element, to the end that irreducible variations in uniformity could be corrected in the final assembly, and also to modify the characteristic of the valve. The usual form of adjustment has been to modify the volume of the power element for any given pressure and temperature condition. However, such type of adjustment introduces a material change of one controlling feature, as will be appreciated by reference to the gas law. In another aspect, therefore, the present invention contemplates a valve body to which may be connected a preformed power element of constant volume under given conditions of temperature, pressure, and weight of thermostatic fluid,—adjustment of the valve characteristic being obtained through the high side of the system.

Other objects and advantages of the invention will be appreciated from the following description of typical embodiments thereof, the novel features of which are set forth in the appended claims, and which are illustrated in the accompanying drawing, wherein:

Fig. 1 is a view partly in section and partly in elevation of a complete thermostatic expansion valve;

Fig. 2 is a top view of the sleeve and attached thermostatic bellows;

Fig. 3 is a top view of the pressure bellows and attached head;

Fig. 4 is a section showing another form of control element sub-assembly; and,

Fig. 5 is a section showing still another embodiment of the control element sub-assembly.

Referring first to Fig. 1, there is illustrated a complete valve including a body 10 formed with an inlet passage 11 which communicates with a valve chamber 12 containing a valve seat 13 and a valve needle 14. The seat 13 is formed with a central orifice 15 communicating with an outlet passage 16, and this orifice also receives an actuator pin 20 for the needle 14. The pin 20 projects through the valve body in concentric relation with an open chamber 17 serving as the breech into which the control cartridge may be fitted.

Adjustment of the valve is effected through the high pressure chamber 12 through a threaded adjusting stem 18 bearing against a spring 19 which is in engagement with the needle 14. A gasketed packing 21 prevents leakage through the stem system. Since the details of this spring and stem arrangement may be modified without departure from the subject matter herein claimed, and since they are further shown in my copending application Serial No. 113,877, filed December 2, 1936, further description of the valve body is deemed unnecessary.

Disposed in the breech 17 and connected to the valve body 10 is a sub-assembly including the power element and pressure bellows or packless gland, which, as shown in Fig. 1, is in the nature of a self-contained cartridge. This unit comprises a substantially cylindrical casing 24, one end of which is closed by the integral end plate or cap 25. Disposed within the casing is a snugly fitted sleeve 26 formed at its upper end with a circular flange 27 to which is secured one end of the bellows member 28. The opposite end of the bellows 28 is affixed to a head 29 which is axially formed with a depending bearing portion 30 and a surrounding spring seat 31 for receiving a spring 32. The cap 25 is also formed with a spring seat 33 and is sufficiently thick at the center to permit of the effective assembly of a tube 34 which extends to a thermostatic bulb 35. It will be observed that when the foregoing parts are assembled, there is formed at the upper end of the cylinder a thermostatic chamber enclosed in part by the bellows 28 which may expand or contract under service conditions.

The open end of the casing 24 is sealed to form a totally closed cartridge by means of a pressure bellows 36 secured at its lower end to an inwardly flanged bushing 37 adapted to be snugly fitted within the sleeve 26. The upper end of the pressure bellows is closed by a head 38 formed with a central bearing socket 39, and adapted to receive a push pin 40 which, after assembly, contacts the bearing portion 30 of the bellows 28. A stop member 41 in the form of a sleeve having an inwardly turned flange, may also be positioned within the sleeve 26 above the bushing 37.

In the preferred mode of making the cartridge, the various parts are formed and the sleeve 26, with the power bellows 28 attached thereto, is inserted in the casing 24. The stop member 41 is then introduced and is pressed to its correct position by inserting the bushing 37 with the attached bellows 36 and head 38, which at this time contains the pin 40. Movement of the bushing 37 may be made any amount desired to bring the pin 40 into contact with the bearing point 30, under the conditions of contraction or pressure in the power bellows chamber which have been adopted as the standard of uniformity. When the parts are properly aligned, as may be readily done due to the simplicity of the parts and their ease of handling without complicated gauges, the joint between the casing 24, sleeve 26, and bushing 37 is secured by solder, indicated by the numeral 42.

It will thus be seen that there is provided a completely sealed operating unit which, by virtue of the type of structure utilized, may be readily made by inexpensive methods of manufacture, without, however, departing from a rigid standard of uniformity. The entire cartridge is hermetically sealed by the pressure bellows 36, thus protecting the power bellows 28 from the effects of moisture. Since the parts are in effect preadjusted with respect to each other, it will be apparent that, upon the charging of the power bellows and bulb 35 in the usual manner with saturated vapor, there is provided a control element for the valve body whose characteristics are predetermined and which needs only to be applied to the valve body 10 to complete the entire assembly. It will also be seen that the power bellows 28 is protected from undue expansion by the stop member 41, whose position is also predetermined during the assembly operations.

The complete cartridge assembly is then simply dropped into the breech 17 of the valve body 10, to bring the bearing area of the pressure bellows head 38 into contact with the push pin 20. With the parts so assembled, the cartridge is soldered to the valve body, as indicated by the numeral 45. In operation, expansion or contraction of the power bellows 28 in response to temperature changes in the bulb 35 modifies the setting of the valve as determined by the pressure of the valve spring and refrigerant on the pressure bellows 36. It will thus be seen that the valve operates in conformity with the desired characteristics of a valve of this class, and that the valve of the present invention permits the attainment of precision operation with desirable economies.

In Fig. 4 the casing is in the form of a single sleeve 50, having a flared upper extremity 51 and an inwardly flanged lower extremity 52, to which one end of the pressure bellows 53 is secured. As in the first embodiment, the remaining end of this bellows is secured to a head 54 which is formed to receive a connecting pin 55. The thermostatic bellows 60 is connected to upper and lower heads 56 and 57 respectively, between which a compression spring 58 may be mounted. The upper head 56 is formed with a central hub 59 which is drilled to receive a thermostatic tube 61. A cap 62, containing a central opening 63 engaging about the hub 59, is formed with a flanged periphery 64 which is disposed in the flared end 51 of the sleeve 50. The cap 62 is soldered to both the hub 59 and sleeve end 51 to seal the unit.

When the thermostatic unit is used in an extremely low temperature installation it is advantageous to protect the thermostatic bellows from too rapid heat exchange action with the valve body and pressure bellows. For this purpose a wall or shield 67 of hard fiber or other insulating material is pressed into the sleeve 50 and into engagement with an annular bead 68. This shield thus divides the air chamber C of the unit and prevents the circulation of air from the thermostatic bellows to the pressure bellows. As a further precautionary measure, the shield is formed with a central aperture 69 in which is inserted a flexible rubber diaphragm 65 formed with a pierced resilient portion 66 which tightly engages the pin 55.

The method of assembling this unit with a valve body and its operation is similar to the first described embodiment of the invention. It will be observed that undue expansion of the thermostatic bellows is limited by the shield 67, which thus additionally serves as a stop member.

The embodiment of the invention shown in Fig. 5 comprises an enclosing sleeve 70 having an upper flange 71 to which is secured one end of the thermostatic bellows 72. The remaining end of the bellows is secured to a head 73, and the thermostatic chamber thus formed is sealed by a flanged cap 74 which is secured to the sleeve 70. The pressure bellows 75 is secured at its upper end to a head 76, and at its lower end to a flanged tubular member 77 which is received in the sleeve and is soldered thereto as indicated by the numeral 78. A shield 79 is interposed between the bellows, and it contains a central opening 81 through which the connecting pin 82 projects with slight clearance. As in Fig. 4, the shield serves as a stop member for the thermostatic bellows as it is rigidly supported on the upper end 83 of the member 77 to prevent excessive downward movement of the bellows.

It will be apparent to those skilled in the art that the thermostatic unit or cartridge, depending upon its use and environment, is capable of many modifications falling within the scope of the appended claims.

I claim:

1. A thermostatic unit comprising a casing and a pair of expansible bellows, all of said elements being closed at one end, means securing the free extremity of one of said bellows to the closed end of the casing to provide a thermostatic chamber within said bellows, means securing the free extremity of the remaining bellows to the free extremity of the casing to provide a sealed air chamber within the casing between the bellows, a wall member of insulating material secured to the casing within the air chamber and formed with an opening, a flexible diaphragm mounted in the opening of the wall member and having a central orifice, and a pin resiliently engaged in the orifice of the diaphragm and having its extremities engaging adjoining closed end of the two bellows.

2. A thermostatic unit comprising a casing formed of a cylindrical sleeve and a cap closing one end of the sleeve, the remaining end of the sleeve being formed with an inturned flange, a thermostatic bellows closed at both ends and having one end secured to the cap member, a sealing bellows closed at one end and having its free extremity secured to the flange of said sleeve, and a pin in the casing connecting the adjoining ends of the two bellows.

LAWRENCE C. SMITH.